United States Patent
Ye et al.

(10) Patent No.: US 8,505,368 B2
(45) Date of Patent: Aug. 13, 2013

(54) FUEL EFFICIENCY MEASURING SYSTEM FOR FUEL CELL VEHICLE

(75) Inventors: Chang Hwan Ye, Gyeonggi-do (KR); Jeong Kyu Park, Gyeonggi-do (KR); Hyun Jun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 237 days.

(21) Appl. No.: 13/029,514

(22) Filed: Feb. 17, 2011

(65) Prior Publication Data
US 2012/0131991 A1    May 31, 2012

(30) Foreign Application Priority Data
Nov. 26, 2010 (KR) .................. 10-2010-0118498

(51) Int. Cl.
*G01M 15/00* (2006.01)
(52) U.S. Cl.
USPC ........................................... 73/114.53
(58) Field of Classification Search
USPC ............... 73/114.38, 114.52, 114.53, 114.54
See application file for complete search history.

(56) References Cited

U.S. PATENT DOCUMENTS

| | | | | |
|---|---|---|---|---|
| 6,978,665 B2* | 12/2005 | Aoyagi et al. | ........ | 73/114.52 |
| 7,210,341 B2* | 5/2007 | Fuse | ........ | 73/149 |
| 8,190,354 B2* | 5/2012 | Jung et al. | ........ | 701/123 |
| 8,197,988 B2* | 6/2012 | Kim et al. | ........ | 429/515 |
| 2004/0110047 A1 | 6/2004 | Hwang et al. | | |
| 2006/0177711 A1 | 8/2006 | Calhoon | | |
| 2009/0030625 A1* | 1/2009 | Jung et al. | ........ | 702/60 |

FOREIGN PATENT DOCUMENTS

| | | |
|---|---|---|
| JP | 2004-153958 A | 5/2004 |
| KR | 10-0831567 B1 | 5/2008 |

OTHER PUBLICATIONS

Jung, Youngwoo et al., "Development of Fuel Economy Measurement Technology for Fuel Cell Electric Vehicle", pp. 152-155.

* cited by examiner

*Primary Examiner* — Eric S McCall
(74) *Attorney, Agent, or Firm* — Edwards Wildman Palmer LLP; Peter F. Corless

(57) ABSTRACT

The present invention provides an improved fuel efficiency measuring system for a fuel cell vehicle which simplifies various valves and hydrogen lines and modulizes its individual elements. More specifically, the present invention provides an improved fuel efficiency measuring system for a fuel cell vehicle that eliminates a purging hydrogen tank previously used for removing residual air in a hydrogen supply line and instead removes residual air in a hydrogen supply line by using a vehicle side hydrogen tank. Additionally, the present invention simplifies couplers installed in a hydrogen supply line, and considerably reduces manufacturing costs by eliminating a high-cost break-away coupler adapted to couple a fuel efficiency measuring unit and the vehicle side.

12 Claims, 2 Drawing Sheets

US 8,505,368 B2

FUEL EFFICIENCY MEASURING SYSTEM FOR FUEL CELL VEHICLE

CROSS-REFERENCE TO RELATED APPLICATION

This application claims under 35 U.S.C. §119(a) the benefit of Korean Patent Application No. 10-2010-0118498 filed Nov. 26, 2010, the entire contents of which are incorporated herein by reference.

BACKGROUND (a) Technical Field

The present invention relates to a fuel efficiency measuring system for a fuel cell vehicle. More particularly, it relates to an improved fuel efficiency measuring system for a fuel cell vehicle which simplifies both various valves and hydrogen lines within the system and modulizes its individual elements.

(b) Background Art

A fuel cell is an electricity generation system that does not convert chemical energy of fuel into heat by combustion, but rather electrochemically converts the chemical energy directly into electrical energy in a fuel cell stack. The fuel cell can be applied to the electric power supply of small-sized electrical and electronic devices, for example portable devices, as well as industrial and household appliances and vehicles. The fuel cell stack is mounted to a fuel cell vehicle to produce electricity through an electrochemical reaction in which hydrogen and oxygen in the air are used as fuels. During the electrochemical reaction hydrogen is supplied from a hydrogen tank in a fuel supply system and oxygen in air is supplied from an air blower in an air supply system.

Those skilled in the art would realize that it is impossible to evaluate the efficiency of a hydrogen fuel cell vehicle in which a fuel cell stack is mounted using previous fuel consumption measuring methods which have been applied to general internal combustion engines, because typically these method measure the amount of carbons contained in exhaust. Since carbons are not present in the hydrogen fuel cell process, a new fuel efficiency measuring method is required which can be applied to hydrogen fuel cell vehicles.

Considering the deficiency in the market, the applicant filed a patent application, Korean Patent No. 10-0831567 and U.S. Patent Application Publication No. 2009/0030625, entitled "Fuel Efficiency Measurement System and Method for Fuel Cell Vehicle" filed May 29, 2008 and is hereby incorporated by reference. This previously filed application relates to a system and a method for accurately measuring the fuel efficiency of a fuel cell vehicle that uses hydrogen as a fuel. However, this fuel efficiency measuring system and method suffers from a number of disadvantages.

One noted disadvantage is that the previous system is that it is made up of many parts. For example, FIG. 2 is a diagrammatic view illustrating a conventional fuel efficiency measuring system for a fuel cell battery as described above. As can be seen from the figure, the previously designed fuel efficiency measuring method includes a hydrogen tank 1 is configured to supply hydrogen to the fuel cell stack, an electronic scale that is configured to measure the weight of the hydrogen tank (1), a plurality of valves (V4, V5, V6, and V7) installed in hydrogen supply lines that are connect the hydrogen tank 1 and to the vehicle and are located between the hydrogen tank 1 and the vehicle. Additionally, a break-away coupler is coupled to a fuel efficiency measuring unit to the vehicle and is configured to prevent leakage of hydrogen when the vehicle is deviated. Purge hydrogen tank 2 is configured to remove residual air in the lines before a test of the system may be conducted. More specifically, valves V1, V2, and V3 are configured to control the direction of hydrogen discharged from the purge hydrogen tank (2), and a line gauge (G1) is configured to measure the pressure of the hydrogen on a downstream side of a regulator or more specifically a high pressure regulator (HPR1). Additionally, a 3-way valve (V8) is configured to redirect the supply direction of hydrogen between a vehicle side hydrogen tank 3 and a fuel efficiency measuring hydrogen tank 1. As can be seen from FIG. 2, the previous system is made up of numerous parts thereby making the assembly complex. Accordingly, the assembling processes may be difficult and time consuming. Thus, it is difficult to manufacture the system and considerably expensive.

Additionally when a coupler or more specifically a quick coupler C1 is connected to a hydrogen tank to allow an electronic scale to accurately measure the weight of the hydrogen tank is separated, a residual hydrogen pressure of about 350 bars exists between the outlet end of the hydrogen tank and the quick coupler. Thus, it is difficult to separate the quick coupler from the system when needed.

SUMMARY OF THE DISCLOSURE

The present invention relates to an improved fuel efficiency measuring system for a fuel cell vehicle that eliminates a purging hydrogen tank for removing residual air in a hydrogen supply line and instead removes residual air in a hydrogen supply line by using a vehicle side hydrogen tank. More particularly, the present invention simplifies the use of various valves and couplers installed in a hydrogen supply line, while at the same time considerably reducing manufacturing costs by eliminating a high-cost break-away coupler which is conventionally adapted to couple a fuel efficiency measuring unit and the vehicle.

In one embodiment of the present invention a fuel efficiency measuring system for a fuel cell vehicle may include a fuel efficiency measuring hydrogen tank, an electronic scale configured to measure the weight of the fuel efficiency measuring hydrogen tank, a vehicle side hydrogen tank, and a stack. More specifically, the fuel efficiency measuring system of the present invention may utilize a pressure relief valve and a fourth valve installed in series in a second hydrogen supply line that may be disposed between a plurality of vehicle side hydrogen tanks and the stack. A first hydrogen supply line extends from an outlet end of the fuel efficiency measuring hydrogen tank and directly connects to the second hydrogen supply line between the fourth valve and the stack. In addition, a high pressure regulator and a quick coupler may be sequentially connected to the outlet end of the fuel consumption measuring hydrogen tank and a first valve and a second valve may be mounted in series to the first hydrogen supply line that extends out from the quick coupler.

To remove residual air within the first hydrogen supply line, a residual air discharging unit may be installed in a branch line that is branched from the first hydrogen supply line and disposed between the first and second valves. The residual air discharging unit uses hydrogen discharged from the vehicle side hydrogen tank to remove any residual air within the first hydrogen tank line. In addition, to discharge hydrogen outside the system when the pressure of the hydrogen is equal to or higher than a reference high pressure, a hydrogen purging safety unit may be installed in a line rebranched from the branch line.

In the preferred embodiment of the present invention, the fuel efficiency measuring system may incorporate a balancing monitor to monitor a detected value of the electronic scale. As mentioned above the electronic scale may be configured to detect the weight of the fuel efficiency measuring hydrogen tank. Additionally, a controller may also be configured to control the opening/closing operations of the valves.

Additionally, the residual air discharging unit may also include a check valve and a third valve mounted in series to the branch line, as well as a vent line extending from an outlet of the third valve to outside the system.

Preferably, the hydrogen purging safety unit may also comprise a purge line that is connected between the branch line, i.e., between the check valve and the third valve of the residual air discharging unit, and the vent line extending from the outlet end of the third valve as well as a safety valve that may be mounted to the purge line at a predetermined position thereof. The safety valve may be set to open if the pressure of supplied hydrogen is equal to or higher than a reference value.

Furthermore the preferred embodiment of the present invention may also include a pressure sensor that is configured to transmit a hydrogen pressure signal to a controller which may be mounted in combination to the outlet end of the fuel efficiency measuring hydrogen tank and the first hydrogen supply line disposed between the quick coupler and the first valve.

Preferably, a hydrogen leak detecting sensor may be configured to detect leakage of hydrogen and transmit a signal to a controller. The hydrogen leak detection sensor may be mounted into a housing in which the fuel efficiency measuring hydrogen tank is installed.

Advantageously, the present invention aides in reducing manufacturing costs by removing residual air in a hydrogen supply line using a vehicle side hydrogen tank instead of a conventional purging hydrogen tank. Furthermore, additional manufacturing cost can be saved and the workability of the overall system can be enhanced by simplifying various valves and couplers installed in a hydrogen supply line.

Manufacturing costs can also be considerably reduced and the fuel efficiency measurement equipment can be made more compact by eliminating a high-cost break-away coupler which typically couples a fuel efficiency measuring unit and a vehicle.

In addition, a quick coupler can be smoothly separated when the weight of a hydrogen tank is measured by mounting a high pressure regulator to an outlet end of a fuel efficiency measuring hydrogen tank, disposing the quick coupler on a downstream side of the high pressure regulator, and reducing the pressure of hydrogen applied to the quick coupler.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

In one aspect of the present invention a method for measuring the efficiency of a fuel cell vehicle is provided. Initially, a monitoring device, measures the weight of a hydrogen tank prior to traveling of the fuel cell vehicle. Then any residual air within a first hydrogen supply line is removed by a discharging unit prior to the traveling of the vehicle by using hydrogen discharged from a vehicle side hydrogen tank. The fuel cell vehicle is then operated on a dynamo system for a predetermined time. During operation, the hydrogen consumed is supplied via the first hydrogen supply line which is directly connected the fuel cell vehicle. Once the vehicle has traveled for a predetermined time, a monitoring device measures the change in weight of the hydrogen tank after the fuel cell vehicle has operated for the predetermined time period. Additionally, the distance the fuel cell vehicle traveled during the predetermined time period is also measured. The fuel efficiency of the fuel cell vehicle can then be calculated by analyzing the change in the weight of the hydrogen tank after the traveling of the vehicle on the dynamo system and the distance traveled.

In another aspect of the present invention, a fuel efficiency measuring system for a fuel cell vehicle includes a first hydrogen tank, an electronic scale configured to measure the weight of the hydrogen tank, at least one second vehicle side hydrogen tank, and a stack. More specifically, the fuel efficiency measuring system has pressure relief valve and a fourth valve installed in a second hydrogen supply line between the at least one vehicle side hydrogen tank and the stack. In addition, a first hydrogen supply line extends from an outlet end of the first hydrogen tank and directly connected to the second hydrogen supply line between the fourth valve and the stack. A regulator and a coupler are also connected to the outlet end of the first hydrogen tank; a first valve and a second valve mounted in series to the first hydrogen supply line extending from the coupler. A discharging unit is installed in a branch line branched from the first hydrogen supply line and is disposed between the first and second valves. This discharging unit is configured to remove residual air within the first hydrogen supply line by using hydrogen discharged from the vehicle side hydrogen tank.

Hereinafter, an exemplary embodiment of the present invention will be described below in detail with reference to the accompanying drawings such that those skilled in the art to which the present invention pertains can easily practice the present invention.

Figure 1:
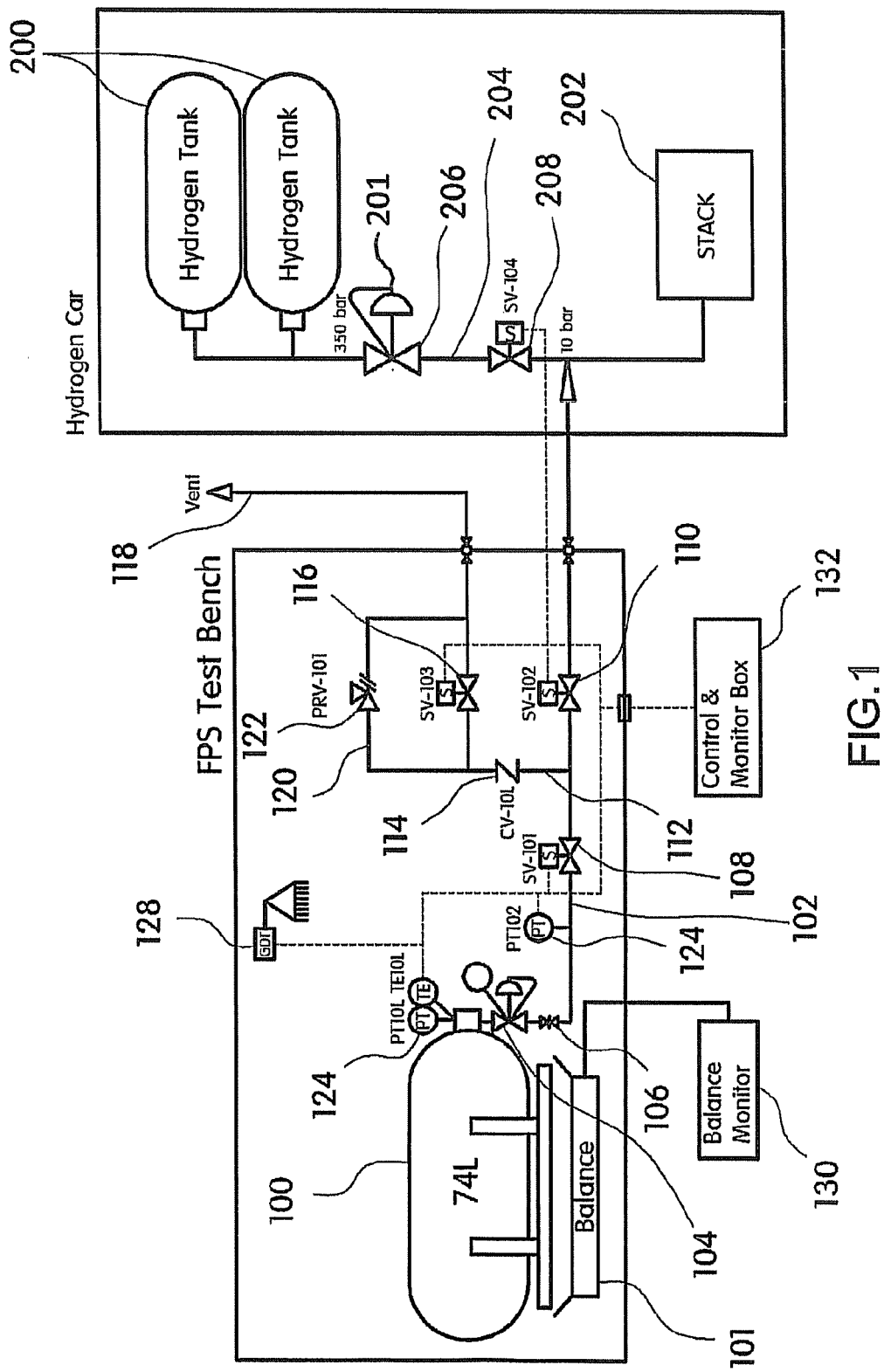
FIG. 1 is a diagrammatic view illustrating a fuel efficiency measuring system for a fuel cell battery according to an embodiment of the present invention.
Figure 2:
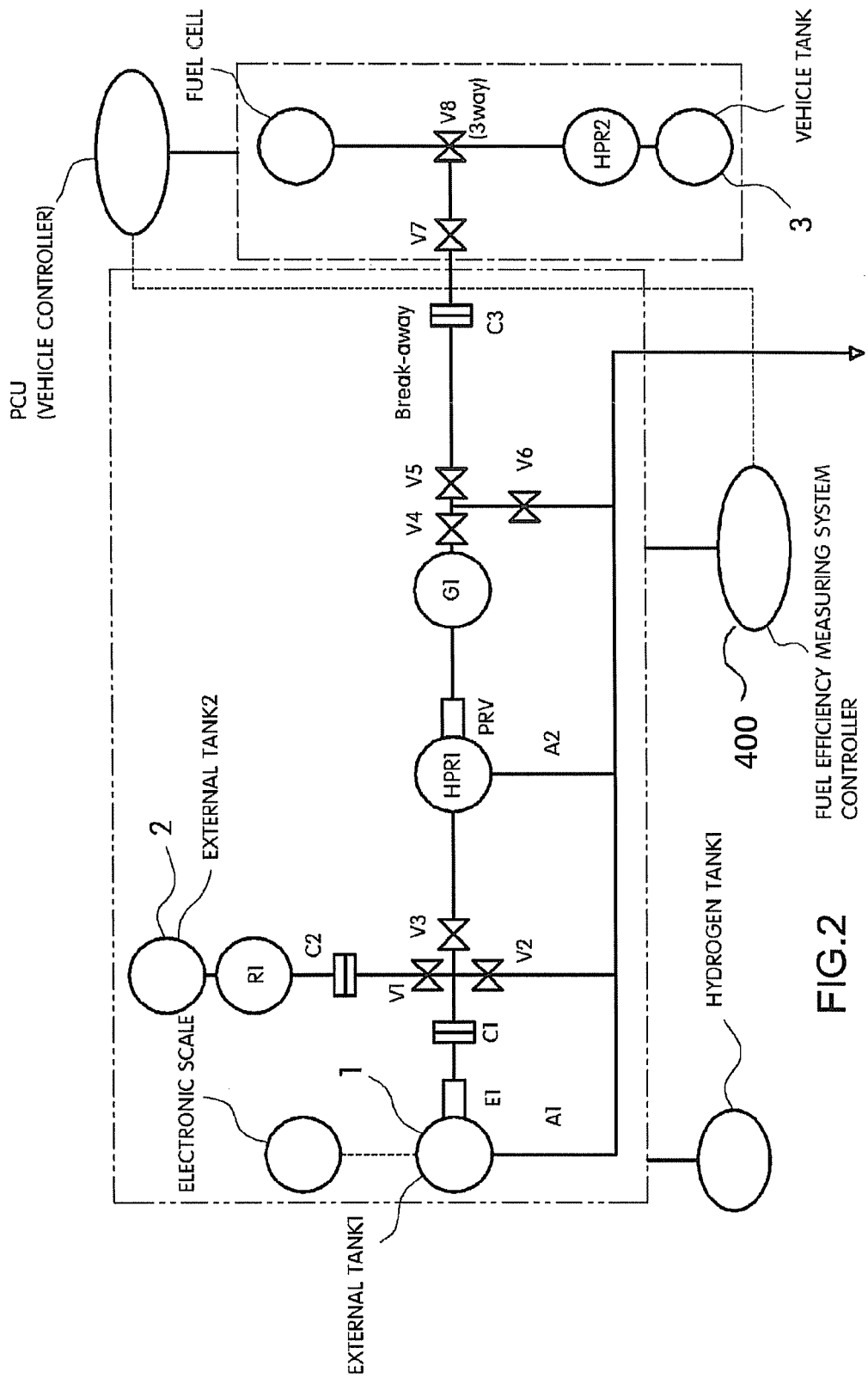
FIG. 2 is a diagrammatic view illustrating a conventional fuel efficiency measuring system for a fuel cell battery.

As illustrated in FIG. 1, a fuel efficiency measuring system for a fuel cell vehicle according to the illustrative embodiment of the present invention includes a fuel efficiency measuring unit having a fuel efficiency measuring hydrogen tank 100 and an electronic scale 101 that is configured to measure the weight of the fuel efficiency measuring hydrogen tank 100. The fuel efficiency measuring unit also includes a vehicle side hydrogen tank 200, and a stack 202 disposed within the vehicle/hydrogen car.

The elements of the fuel efficiency measuring unit may be installed collectively within a housing having a certain volume. In particular, the fuel efficiency measuring hydrogen tank 100 is laid on the electronic scale 101 and a first hydrogen supply line 102 extending toward the vehicle is connected to an outlet end of the fuel efficiency measuring hydrogen tank 100. A high pressure regulator 104 and a quick coupler 106 may be then sequentially connected to the outlet end of the fuel efficiency measuring hydrogen tank 100.

Conventionally, a quick coupler is mounted to an outlet end of a hydrogen tank first. When the quick coupler is separated to measure the weight of the hydrogen tank, there is a residual pressure of hydrogen of about 350 bars between the outlet end of the hydrogen tank and the quick coupler. Therefore, it is very difficult to separate the quick coupler due to the residual pressure.

Contrary to the conventional technology, however, the present invention utilizes as the high pressure regulator 104 that is installed first at the outlet end of the hydrogen tank 100 and then at the quick coupler 106. The pressure of hydrogen at a rear end of the high pressure regulator 104 is then lowered from about 350 bars to about 10 bars, thereby enabling a user easily separate the quick coupler 106.

Furthermore, in the illustrative embodiment of the present invention, a first valve 108 and a second valve 110 may be mounted to a first hydrogen supply line 102 extending from the quick coupler 106 such that they can be opened and closed under the control of a controller 132. The first hydrogen supply line 102 also extends from the second valve 110 so that the first hydrogen supply line 102 is directly connected to a second hydrogen supply line 204 on the vehicle side by using a general line connector.

In more detail, a pressure relief valve 206 and a fourth valve 208 may be mounted in series to the second hydrogen supply line 204 which is connected to both the vehicle side hydrogen tank 200 and the stack 202 between the vehicle side hydrogen tank 200 and the stack 202. In addition, a distal end of the first hydrogen supply line 102 is directly connected to the second hydrogen supply line 204 connecting the fourth valve 208 and the stack 202 between the fourth valve 208 and the stack 202.

Conventionally, a first hydrogen supply line of a fuel efficiency measuring unit and a second hydrogen supply line on the vehicle side are connected to each other through a break-away coupler. A break away coupler allows the vehicle/hydrogen car to be smoothly separated without leaking hydrogen in case the vehicle/hydrogen car is separated from the fuel efficiency measuring unit 400. In the system and method of the present invention, however, it is not possible for a vehicle to be separated during a fuel efficiency measurement test. Thus the break-away coupler is eliminated and a distal end of the first hydrogen supply line 102 is directly connected to the second hydrogen supply line 204 connecting the fourth valve 208 and the stack 202 between the fourth valve 208 and the stack 202 using a general line connector.

According to the illustrative embodiment of the present invention, a branch line 112 is branched from the first hydrogen supply line 102 between the first and second valves 108 and 110. A residual air discharging unit is installed in the branch line 112 and is configured to remove the air remaining within the first hydrogen supply line 102 by utilizing the hydrogen that is discharged form the vehicle side hydrogen tank 200.

That is, the residual air discharging unit has a check valve 114 that is mounted first to the branch line 112 branched from the first hydrogen supply line 102. A third valve 116 is also mounted in series to a back end of a check valve 114. Furthermore, a vent line 118 is connected to an outlet of the third valve 116 and extends to outside the fuel efficiency measuring unit 400.

According to one aspect of the present invention, when the pressure of hydrogen flowing within the first supply line 102 is equal to or higher than a reference value, it is regulated for safety by purging the hydrogen. To achieve this, a hydrogen purging safety unit is configured to discharge hydrogen to outside the system when the pressure of hydrogen is equal to or higher than the reference value. The hydrogen purging safety unit is installed in a line branched again from the branch line 112.

For example, the hydrogen purging safety unit may include a purge line 120 and a safety valve 122. One end of the purge line 120 is connected to the branch line 112 between the check valve 114 and the third valve 116 of the residual air discharging unit and an opposite end thereof is connected to the vent line 118 extending from the outlet end of the third valve 116. The safety valve 122 is mounted to a predetermined position of the purge line 120 and is set so that if the pressure of supplied hydrogen rises to a reference value or higher, the safety valve 122 automatically opens.

Meanwhile, a balancing monitor configured to monitor a detected value of the electronic scale 101 may also be connected to the electronic scale 101. In particular, a controller 132 for controlling opening/closing operations of valves is connected to valves 108, 110, 116, and 208, which may be solenoid valves.

A pressure sensor 124 may also be configured to transmit a hydrogen pressure signal to a controller 132 that is mounted to the outlet end of the fuel efficiency measuring hydrogen tank 100 and the first hydrogen supply line 102 between the quick coupler 106 and the first valve 108.

Additionally, a hydrogen leak detecting sensor 128 configured to detect leakage of hydrogen and transmit a signal to a controller 132 may also be mounted into a housing in which the fuel efficiency measuring hydrogen tank is installed. In this illustrative embodiment, the fuel efficiency measuring hydrogen tank 100 is installed such that when hydrogen is leaked, all the valves may be controlled to be closed by the controller 132, while at the same time generating an alarm sound.

Hereinafter, a fuel efficiency measuring process based on the above-described configurations will be described in detail. First, a step of checking the weight of the fuel efficiency measuring hydrogen tank prior to traveling of the vehicle whose fuel efficiency is to be measured.

In this regard, the electronic scale 102 measures the weight of the fuel efficiency measuring hydrogen tank 100 and the balancing monitor 130 monitors the measured result value.

Then, after the quick coupler 106 situated next to the high pressure regulator 104 is separated from the outlet end of the fuel efficiency measuring hydrogen tank 100, the weight of the fuel efficiency measuring hydrogen tank 100 is measured. Advantageously, as the pressure of hydrogen at the rear end of the high pressure regulator 104 is lowered from about 350 bars to about 10 bars, the quick coupler 106 can be easily separated.

Next, optimal conditions that are suitable for a fuel efficiency testing is secured by removing any residual air within the hydrogen supply line prior to the traveling of the vehicle.

In this regard, the first valve 108 is controlled to be closed and valves 110, 116, and 208 may be controlled to be opened.

Thus, after the pressure of the hydrogen discharged from the vehicle side hydrogen tank 200 is regulated in the pressure relief valve 206, the discharged hydrogen enters the first hydrogen supply line 102 through the fourth valve 208 and then passes through the second valve 110, the check valve 114, and the third valve 116 to be discharged to the outside through the vent line 118 such that the residual air left within the first hydrogen supply line 102 is discharged and removed to the outside together with hydrogen.

After the residual air in the hydrogen supply line is removed using the above described process, an actual fuel efficiency measuring process is performed. That is, a test vehicle travels in a chassis dynamo system, thereby requiring the fuel cell stack 202 to use the hydrogen in the fuel efficiency measuring hydrogen tank 100 as a fuel during the traveling of the vehicle by supplying the hydrogen in the fuel efficiency measuring hydrogen tank 100 with the hydrogen supply system of the vehicle being blocked. Effectively, the fuel efficiency of the vehicle is calculated based on a change in the weight of the fuel efficiency measuring hydrogen tank 100 after the traveling of the vehicle and a traveling distance of the vehicle.

In order to prevent the hydrogen within the hydrogen tanks 200 from being delivered to the stack 202, the fourth valve 208 is controlled to be closed, and the hydrogen in the fuel efficiency measuring hydrogen tank 100 is flowed along the first hydrogen supply line 102 by controlling the first and second valves 108 and 110 to be opened and the third valve 116 to be closed at the same time.

Then, the hydrogen discharged to the first hydrogen supply line 102 enters the second hydrogen supply line 204 and is supplied to the fuel cell stack 202 at the same time, thereby starting an electric power producing operation of the fuel cell stack 202.

Meanwhile, if the pressure of the hydrogen applied to the first hydrogen supply line 102 is equal to or higher than a reference value, it influences the safety valve 122 of the purge line 120 through the check valve 114. That is, the high pressure hydrogen may cause a safety problem when the safety valve 122 automatically opens. In that case, the hydrogen of a reference value or higher passes through the safety valve 122 and is discharged through the vent line 118 at the same time.

After operating the stack for a predetermined time period while consuming the hydrogen in the fuel efficiency measuring hydrogen tank 100, a start key is keyed to an off position to complete the fuel efficiency test. Subsequently, valves 108, 110, 116, and 208 are controlled to be closed according to an instruction of the controller 132 so that the hydrogen in the fuel efficiency measuring hydrogen tank 110 cannot be supplied any more.

Finally, after separation of the quick coupler 106, the electronic scale 101 measures the weight of the fuel efficiency measuring hydrogen tank 100 after the traveling of the fuel cell vehicle and the balancing monitor 130 monitors the fuel efficiency of the vehicle. Accordingly, a gasoline equivalent fuel efficiency calculation can be determined by analyzing both the change in the weight of the fuel efficiency measuring fuel tank after the traveling of the vehicle and the traveling distance collected by the controller 132.

The invention has been described in detail with reference to an exemplary embodiment thereof. However, it will be appreciated by those skilled in the art that changes may be made in these embodiments without departing from the principles and spirit of the invention, the scope of which is defined in the appended claims and their equivalents. Further, many modifications may be made to specific situations and materials without departing from the essence of the invention. Therefore, the present invention is not limited to the detailed description of the preferred embodiments but includes all embodiments within the scope of the attached claims.

What is claimed is:

1. A fuel efficiency measuring system for a fuel cell vehicle including a fuel efficiency measuring hydrogen tank, an electronic scale configured to measure the weight of the fuel efficiency measuring hydrogen tank, vehicle side hydrogen tanks, and a stack, the fuel efficiency measuring system comprising:
    a pressure relief valve and a fourth valve installed in series in a second hydrogen supply line between the vehicle side hydrogen tanks and the stack;
    a first hydrogen supply line extending from an outlet end of the fuel efficiency measuring hydrogen tank and directly connected to the second hydrogen supply line between the fourth valve and the stack;
    a high pressure regulator and a quick coupler sequentially connected to the outlet end of fuel efficiency measuring hydrogen tank, the high pressure regulator installed between the outlet end of the fuel efficiency measuring hydrogen tank and the quick coupler;
    a first valve and a second valve mounted in series to the first hydrogen supply line extending from the quick coupler;
    a residual air discharging unit installed in a branch line branched from the first hydrogen supply line between the first and second valves and configured to remove residual air within the first hydrogen supply line using hydrogen discharged from the vehicle side hydrogen tank; and
    a hydrogen purging safety unit installed in a line rebranched from the branch line and configured to discharge hydrogen to the outside when the pressure of the hydrogen is equal to or higher than a reference high pressure.

2. The fuel efficiency measuring system of claim 1, further comprising:
    a balancing monitor configured to monitor a detection value of the electronic scale, the electronic scale configured to detect the weight of the fuel efficiency measuring hydrogen tank; and
    a controller configured to control opening/closing operations of the valves.

3. The fuel efficiency measuring system of claim 1, wherein the residual air discharging unit further comprises:
    a check valve and a third valve mounted in series to the branch line; and
    a vent line extending from an outlet of the third valve to outside the fuel efficiency system.

4. The fuel efficiency measuring system of claim 3, wherein the hydrogen purging safety unit further comprises:
    a purge line connected between the branch line, which is between a check valve and a third valve of the residual air discharging unit, and a vent line extending from an outlet end of the third valve; and
    a safety valve mounted to the purge line at a predetermined position thereof.

5. The fuel efficiency measuring system of claim 4, wherein the safety valve is set to open if the pressure of supplied hydrogen is equal to or higher than a reference value.

6. The fuel efficiency measuring system of claim 1, wherein a pressure sensor configured to transmit a hydrogen pressure signal to a controller is mounted to the outlet end of the fuel efficiency measuring hydrogen tank and the first hydrogen supply line, pressure sensor disposed between the quick coupler and the first valve.

7. The fuel efficiency measuring system of claim 1, wherein a hydrogen leak detecting sensor configured to detect leakage of hydrogen and transmit a signal to a controller is mounted into a housing in which the fuel efficiency measuring hydrogen tank is installed.

8. The fuel efficiency measuring system of claim 1, further comprising a hydrogen purging safety unit installed in a line rebranched from the branch line and configured to discharge hydrogen outside the system when the pressure of the hydrogen is equal to or higher than a reference pressure.

9. The fuel efficiency measuring system of claim 1, wherein the hydrogen purging safety unit further comprises:
    a purge line connected between the branch line, which is between a check valve and a third valve of the residual air discharging unit, and a vent line extending from an outlet end of the third valve; and
    a safety valve mounted to the purge line at a predetermined position thereof.

10. The fuel efficiency measuring system of claim 9, wherein the safety valve is set to open if the pressure of supplied hydrogen is equal to or higher than a reference value.

11. A fuel efficiency measuring system for a fuel cell vehicle including a first hydrogen tank, an electronic scale configured to measure the weight of the hydrogen tank, at least one second vehicle hydrogen tank, and a stack, the fuel efficiency measuring system comprising:
- a pressure relief valve and a fourth valve installed in a second hydrogen supply line between the at least one vehicle side hydrogen tank and the stack;
- a first hydrogen supply line extending from an outlet end of the first hydrogen tank and directly connected to the second hydrogen supply line between the fourth valve and the stack;
- a regulator and a coupler connected to the outlet end of the first hydrogen tank;
- a first valve and a second valve mounted in series to the first hydrogen supply line extending from the coupler;
- a discharging unit installed in a branch line branched from the first hydrogen supply line and disposed between the first and second valves, the discharging unit configured to remove residual air within the first hydrogen supply line using hydrogen discharged from the vehicle side hydrogen tank, and
- a residual air discharging unit installed in a branch line branched from the first hydrogen supply between the first and second valves and configured to remove residual air within the first hydrogen supply line using hydrogen discharged from the vehicle side hydrogen tank;

wherein the residual air discharging unit comprises:
- a check valve and a third valve mounted in series to the branch line; and
- a vent line extending from an outlet of the third valve to outside the fuel efficiency system.

12. A fuel efficiency measuring system for a fuel cell vehicle including a first hydrogen tank, an electronic scale configured to measure the weight of the hydrogen tank, at least one second vehicle hydrogen tank, and a stack, the fuel efficiency measuring system comprising:
- a pressure relief valve and a fourth valve installed in a second hydrogen supply line between the at least one vehicle side hydrogen tank and the stack;
- a first hydrogen supply line extending from an outlet end of the first hydrogen tank and directly connected to the second hydrogen supply line between the fourth valve and the stack;
- a regulator and a coupler connected to the outlet end of the first hydrogen tank;
- a first valve and a second valve mounted in series to the first hydrogen supply line extending from the coupler;
- a discharging unit installed in a branch line branched from the first hydrogen supply line and disposed between the first and second valves, the discharging unit configured to remove residual air within the first hydrogen supply line using hydrogen discharged from the vehicle side hydrogen tank;
- a safety valve mounted to the purge line at a predetermined position thereof; and
- wherein a hydrogen leak detecting sensor configured to detect leakage of hydrogen and transmit a signal to a controller is mounted into a housing in which the fuel efficiency measuring hydrogen tank is installed.

* * * * *